Figure 1:
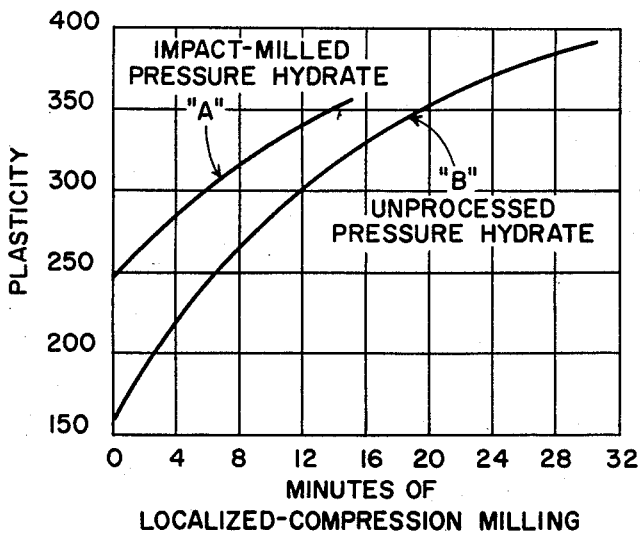

NATURAL LOW PLASTICITY LIME

NATURAL HIGH PLASTICITY LIME

INVENTORS
Joseph Volk
Frank E. Kinsinger
BY
ATTORNEY

United States Patent Office 2,956,867
Patented Oct. 18, 1960

2,956,867

BUILDING LIME

Joseph Volk, North Tonawanda, N.Y., and Frank E. Kinsinger, Yorktown, Va., assignors to National Gypsum Company, Buffalo, N.Y., a corporation of Delaware Filed June 20, 1956, Ser. No. 592,555

2 Claims. (Cl. 23—293)

The present invention is directed to an improved building lime and to its method of manufacture. The invention relates, particularly, to the processing of a substantially dry, pressure-hydrated lime.

The hydration of dolomitic quicklime under pressure to convert not only the CaO, but also the MgO in large part, to their respective hydroxides has long been recognized in the art. The disadvantages, as well as the advantages, of the pressure-hydrate, as compared to normal, atmospherically-hydrated dolomitic lime, are also well recognized. Many attempts have been made to alter the disadvantageous characteristics of pressure-hydrate to improve its acceptance as a building lime, so that the building trade can better take advantage of the recognized advantages of the product.

Tube, rod, or ball milling were well recognized, at the onset of commercial pressure-hydration of lime, as providing increased plasticity of the substantially dry, pressure-hydrate increasing the plasticity as a function of the time of such milling. Tube, rod and ball milling are all related in that material being so milled is being repeatedly compressed between adjacent surfaces of relatively heavy balls or rods. Accordingly, tube, rod and ball mills and their equivalents are referred to hereinafter as localized-compression mills.

The theories have been advanced heretofore that the increased plasticity from localized-compression milling was the result of an agglomerating caused by the milling, with only a minimum amount of grinding.

The poor soaking qualities and the lack of hoddability of the localized-compression milled, pressure-hydrate have been repeatedly discussed in relation to prior attempts to overcome these problems, one of the later of such publications being U.S. Patent 2,701,209 of Huntzicker, who attributes the poor soaking and lack of hoddability to the localized-compression milling process.

It has now been found that pressure-hydrate, without further additives, may be processed in accordance with the present invention, which includes localized-compression milling, resulting in a pressure-hydrate of superior plasticity, improved soaking properties and improved hoddability.

It is an object of the present invention to provide a method for processing pressure-hydrate to form a lime of high plasticity having improved soaking, and hoddability properties. It is a further object to provide such a method which requires no admixtures to the lime. It is a still further object of the present invention to provide such a method for processing to a superior pressure-hydrate which results in decreased manufacturing costs and operational time.

A further object of the invention is to provide a superior pressure-hydrate which has been processed in accordance with the abovesaid methods. Briefly, the method of the present invention includes subjecting a pressure-hydrate to the action of an impact mill, followed by a relatively short period of localized-compression milling.

The calcination of dolomitic limestone and the subsequent hydration to a pressure-hydrate are well known in the art. Dolomitic limestone, such as found in northwestern Ohio, is a mixture of calcium and magnesium carbonates. Calcination of this rock results in dolomitic quicklime, a mixture of calcium and magnesium oxides. Hydration of dolomitic quicklime at atmospheric pressure, producing atmospheric-hydrate, is limited in reaction substantially to the hydration of the calcium oxide. Atmospheric-hydrate has been found to be an unsound material in certain respects and pressure hydration of the dolomitic quicklime has been resorted to to avoid the above unsoundness. The pressure hydration of lime, as is well known, consists of the addition of a proper ratio of water to obtain a substantially dry product, and subjecting the lime in the form of quicklime and/or atmospheric-hydrate, and water to pressures in the order of 150 to 300 p.s.i. at the equivalent temperatures for saturated steam vapor for a period in the order of 5 to 30 minutes. The conditions for pressure hydration are not considered pertinent to the present invention, but are known to provide a product in which the calcium oxide is substantially all hydrated to the hydroxide and the magnesium oxide is in large part also hydrated to the hydroxide.

The pressure-hydrated lime, referred to herethroughout as pressure hydrate, will ordinarily, immediately following hydration, be in the form of a substantially dry, fine, fluffy powder, which, when soaked with sufficient water to form a paste, will be found to have a relatively low plasticity compared to a good building lime. A lime putty of low plasticity is known to be unsatisfactory as lacking workability during application as a wall finishing lime.

Subsequent localized-compression milling of pressure-hydrate, to increase plasticity, is known. However, in accordance with the present invention, the pressure-hydrate is first subjected to an impact milling operation, the results of which have proven quite unexpected and contrary to prior teachings. Impact milling of the pressure-hydrate consists of subjecting the substantially dry powder in a colliding respect to a high-relative-velocity, solid, hammer-like means. Such a process may be carried on in any of several mills available of the class generally known as hammer-mills or impact mills, provided the general arrangement and design of the apparatus is susceptible to imparting high velocity impact to substantially all of the fine powdered raw product to be fed thereto. Such apparatus is available in varying forms from several U.S. manufacturers, an example of a preferred form of such apparatus being a Raymond hammer-type Imp pulverizer, as discussed and shown on pages 1924, 1925 of the second edition of The John H. Perry Chemical Engineers Handbook. The whizzer separator, thereshown in combination with the Imp pulverizer, is not essential in any form in embodiments of the present invention, however, the use of air separation apparatus may be incorporated in the practice of the present invention.

In the preferred form of the invention, the pressure-hydrate is fed to an impact mill which directs the pressure-hydrate through the rotating path of a plurality of hammers. The hammers rotate at a peripheral speed in the order of 20,000 feet per minute, colliding at high relative velocities with the pressure-hydrate. The pressure-hydrate, upon passing through the pathway of the hammers and being subjected thereby to an indeterminate number of collisions, is ejected from the impact mill.

The impact-milled hydrate, unexpectedly, is in certain respects of the same nature as the localized-compression milled hydrate of the prior art. The relatively instantaneous impact milling operation increases the pressure-hydrate plasticity an amount equivalent to about six minutes of the more common prior form of localized-compression milling, to be discussed further hereinafter.

Soaking properties and hoddability of the impact milled product are worse than that obtained by any reasonable amount of localized-compression milling alone.

The impact or hammer-milled product, of poorer apparent characteristics than either an unprocessed pressure-hydrate, or a localized-compression milled pressure-hydrate, is then subjected, in accordance with the invention, to a relatively short period of localized-compression milling. The preferred form of localized-compression milling is ball milling, generally in accordance with the prior commercial practice of ball milling of pressure-hydrate in the standard single milling operation, but with a considerably decreased amount of milling. The ball mill contains steel balls of approximately ¾" diameter, with a weight ratio of balls to lime of about 10:1. This novel combination of milling steps, both of which individually increase plasticity and decrease hoddability and soakability, have been found to provide a new and improved processed pressure-hydrate of improved plasticity, hoddability and soakability.

Figure 2:
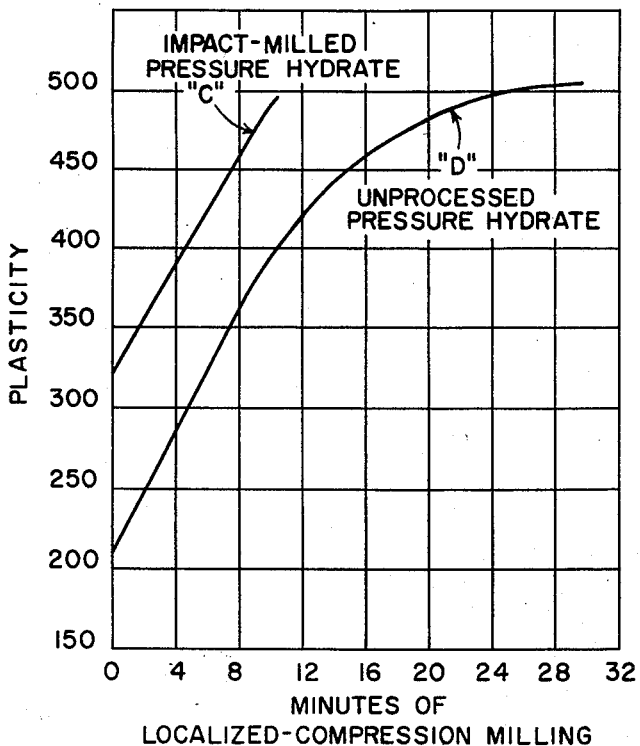

Reference is here directed to the drawings in which Fig. 1 is a graphical comparison of the effect of ball milling, with a natural low-plasticity, pressure-hydrate, on a previously impact-milled pressure-hydrate in accordance with the invention, compared to that on an otherwise unprocessed pressure-hydrate. Fig. 2 is a similar graphical representation for a typical natural high-plasticity pressure-hydrate.

The natural plasticities of unprocessed pressure-hydrates will vary generally in the range of readings of 100 to 200, taken on an Emley plasticimeter. A.S.T.M. specification C6–49 specifies a minimum plasticity for finishing lime of 200, as measured by the Emley plasticimeter in accordance with A.S.T.M. specification C110–49.

Fig. 1 shows the plasticity of a typical natural low-plasticity pressure-hydrate of 150 in relation to the time of ball milling performed on the product. Curve A shows this relation for a pressure-hydrate having been previously impact milled in accordance with the present invention. Curve B shows this relation for the same pressure-hydrate, but which has not been previously processed subsequent to hydration.

The sloped curve A, starting at zero minutes, will be seen to be identical to the slope of that portion of curve B starting from the sixth minute on curve B.

Fig. 2 shows similar data to that shown in Fig. 1 for a natural high-plasticity pressure-hydrate of 200, curve C representing the previously impact-milled material in accordance with the invention and curve D representing the unprocessed, otherwise identical, pressure-hydrate. Curve C, similarly, closely equals that portion of curve D starting at 6 minutes of ball milling, increasing in plasticity even more sharply than that portion of curve D following the sixth minute of ball-milling. Thus, it will be seen that in the practice of the present invention, to obtain plasticities equivalent to prior solely ball-milled pressure-hydrate, the ball milling time is reduced six or more minutes with the particular equipment and conditions prescribed above for the preferred form of the invention. In a continuous operation, the feed rate will be increased between approximately 30 and 300%, depending on the type or quality of pressure-hydrate and the plasticity desired.

As mentioned hereinabove, the inobvious improvement in hoddability and soaking characteristics brought about by the subsequent ball-milling of the impact-milled pressure-hydrate is of critical importance in the present invention. Thus, the minimum length of the secondary ball-milling operation will be limited, not only by the plasticity desired, but by a sufficient amount of ball-milling to provide the improvement in hoddability and soak. Thus, in a natural high plasticity pressure-hydrate, Fig. 2, impact-milled, but not ball-milled, it will be noted that the plasticity is already sufficiently high for use as a finishing lime. Soak and hoddability, properties not suitably susceptible to determination for graphical representation, are poorer than unprocessed pressure-hydrates or the limes of the prior art. Thus, in contradiction to prior teachings, the impact-milled pressure-hydrate must be localized-compression milled for a time sufficient to improve the soak and hoddability to an acceptable, but otherwise undefinable, level.

Having completed a detailed description of the preferred embodiment of our invention so that those skilled in the art may practice the same, we contemplate that other variations may be made without departing from the essence of the invention or the scope of the appended claims.

We claim:
1. The process of physically altering the substantially dry product of a pressure hydration of dolomitic lime having a specific natural plasticity to increase the plasticity and improve the hoddability and soaking properties of said product, comprising the steps of subjecting said product first to a high velocity impact milling and thereby increase the plasticity thereof by an amount equal to about 100 points on the Emley scale in excess of the natural plasticity of the unprocessed product, and then subjecting the product of said impact milling to a localized compression milling sufficient to materially increase the plasticity of said product to a final specific plasticity of at least 200 Emley plasticity and in excess of the plasticity of the product of impact milling alone by an amount equal at least to about 25 points on the Emley scale.

2. The process according to claim 1 wherein said impact milling is carried out in a hammer mill.

References Cited in the file of this patent
UNITED STATES PATENTS

| | | |
|---|---|---|
| 1,536,990 | Van Gelder | May 5, 1925 |
| 1,591,758 | Griffin | July 6, 1926 |
| 1,737,800 | Loudon | Dec. 3, 1929 |
| 2,313,010 | Brudal | Mar. 2, 1943 |
| 2,523,996 | Poole | Sept. 26, 1950 |
| 2,663,646 | Huntzicker et al. | Dec. 22, 1953 |
| 2,663,647 | Huntzicker et al. | Dec. 22, 1953 |